United States Patent
Hwang et al.

(10) Patent No.: US 8,615,701 B2
(45) Date of Patent: Dec. 24, 2013

(54) APPARATUS AND METHOD FOR INDICATING A PACKET ERROR IN AN AUDIO AND VIDEO COMMUNICATION SYSTEM

(75) Inventors: Sung-Hee Hwang, Gyeonggi-do (KR); Hak-Ju Lee, Incheon (KR); Se-Ho Myung, Gyeonggi-do (KR); Jin-Hee Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 51 days.

(21) Appl. No.: 13/312,464

(22) Filed: Dec. 6, 2011

(65) Prior Publication Data

US 2012/0144265 A1   Jun. 7, 2012

(30) Foreign Application Priority Data

Dec. 6, 2010   (KR) ......................... 10-2010-0123238

(51) Int. Cl.
*H03M 13/25*   (2006.01)
*H03M 13/53*   (2006.01)

(52) U.S. Cl.
USPC .......................................... 714/776; 714/758

(58) Field of Classification Search
None
See application file for complete search history.

(56) References Cited

U.S. PATENT DOCUMENTS

| | | | | |
|---|---|---|---|---|
| 6,804,257 B1 * | 10/2004 | Benayoun et al. | ............ | 370/471 |
| 7,230,932 B2 * | 6/2007 | Numminen | .................... | 370/311 |
| 7,340,180 B2 * | 3/2008 | Farmer et al. | ................. | 398/159 |
| 7,835,314 B2 * | 11/2010 | Yee et al. | .................... | 370/310.1 |
| 7,986,715 B2 * | 7/2011 | Song et al. | ..................... | 370/470 |
| 8,027,366 B1 * | 9/2011 | Tang et al. | ..................... | 370/474 |
| 8,385,238 B2 * | 2/2013 | Song et al. | ..................... | 370/310 |
| 2008/0244352 A1 * | 10/2008 | Kwon et al. | .................. | 714/748 |
| 2009/0080573 A1 * | 3/2009 | Song et al. | ..................... | 375/321 |

\* cited by examiner

*Primary Examiner* — Ajay Bhatia
*Assistant Examiner* — Dipakkumar Gandhi
(74) *Attorney, Agent, or Firm* — The Farrell Law Firm, P.C.

(57) ABSTRACT

An apparatus and method are provided for indicating an error of a transport packet in an audio and video communication system. The method includes receiving a frame including a transport packet, attempting Forward Error Correction (FEC) on the frame, and setting a value of an error indicating field in the transport packet according to a result of the FEC. The error indicating field includes at least one of a first flag indicating a presence or absence of an error in the transport packet, a second flag indicating a success or failure of the FEC, and a third flag indicating detection or non-detection of a Cyclic Redundancy Check (CRC).

24 Claims, 7 Drawing Sheets

APPARATUS AND METHOD FOR INDICATING A PACKET ERROR IN AN AUDIO AND VIDEO COMMUNICATION SYSTEM

PRIORITY

The present application claims priority under 35 U.S.C. §119(a) to a Korean patent application Serial No. 10-2010-0123238, which was filed in the Korean Intellectual Property Office on Dec. 6, 2010, the entire content of which is incorporated herein by reference.

BACKGROUND OF THE INVENTION

1. Field of the Invention

The present invention relates generally to an audio and video communication system, and in particular, to an apparatus and method for indicating an error state of a transport packet in an audio and video communication system.

2. Description of the Related Art

A Moving Picture Experts Group 2-Transport Stream (MPEG2-TS) packet, which is defined for audio and video broadcast data transmission, has a fixed length of 188 bytes including a 4-byte header and a 184-byte adaptation field/payload. The header includes a 1-bit Transport_Error_Indicator field indicating either the presence or absence of an error in a Transport Stream (TS) packet. The Transport_Error_Indicator field is set to a value indicating the absence of an error in a transmission from a transmitter. A physical layer of a receiver receiving the TS packet determines the presence or absence of an error, based on the error correction result of a Forward Error Correction (FEC) or the error detection result of a Cyclic Redundancy Check (CRC), sets the Transport_Error_Indicator field to a value indicating the check result, and provides the same to an upper layer.

The CRC for the TS packet may or may not be used. That is, if a CRC for each TS packet is not used, the presence or absence of an error in each TS packet is determined by the receiver, based only on a result of the FEC. However, in this case, the receiver cannot properly know how the presence or absence of an error is determined because the receiver determines the presence or absence of an error in each TS packet depending on an indicated flag value regardless of how the presence or absence of an error is determined.

Further, if a CRC for each TS packet is used, and it is determined that an error correction by FEC fails and there is no error as a result of CRC, or if it is determined that an error correction by FEC succeeds but there is an error as a result of CRC, i.e., when the CRC result and the FEC result provide different indications, the receiver cannot represent the various states.

In processing an AV stream extracted from TS packets, the receiver performs an erasure correction using error information of the TS packets. Therefore, the reliability of an erasure flag is important for correct erasure correction. Accordingly, information about states, such as detection or non-detection of a CRC, a result of a CRC detection and a result of an FEC in the physical layer, should be transmitted accurately.

Accordingly, a need exists for an improved scheme for indicating an error state, such as a result of a CRC detection, as a result of an FEC.

SUMMARY OF THE INVENTION

The present invention is designed to substantially solve at least the above-described problems and/or disadvantages and to provide at least the advantages below.

Accordingly, an aspect of the present invention is to provide an apparatus and method for accurately indicating an error state of a transport packet in an audio and video communication system.

Another aspect of the present invention is to provide an apparatus and method for indicating an error state, which reflects an FEC result and a CRC result, in an audio and video communication system.

Another aspect of the present invention is to provide an apparatus and method for indicating an error state for each sub-packet in an audio and video communication system.

According to an aspect of the present invention, a method for operating a receiver in a communication system is provided. The method includes receiving a frame including at least one transport packet; attempting to perform an FEC on the frame; and setting a value of at least one error indicating field in the transport packet according to the result of the FEC, wherein the error indicating field includes at least one of a first flag indicating the presence/absence of an error in the transport packet, a second flag indicating the success/failure of the FEC, and a third flag indicating the detection/non-detection of a CRC.

According to another aspect of the present invention, a method for operating a transmitter in a communication system is provided. The method includes generating a transport packet header including an error indicating field; constructing a frame including at least one transport packet; performing FEC encoding on the frame; and transmitting the frame, wherein the error indicating field includes at least one of a first flag indicating the presence/absence of an error in the transport packet, a second flag indicating the success/failure of an FEC, and a third flag indicating the detection/non-detection of a CRC.

According to another aspect of the present invention, an apparatus of a receiver in a communication system is provided. The apparatus includes a receiving unit for receiving a frame including at least one transport packet; a decoding unit for attempting to perform an FEC on the frame; and a channel decoding unit for setting a value of at least one error indicating field in the transport packet according to the result of the FEC, wherein the error indicating field includes at least one of a first flag indicating the presence/absence of an error in the transport packet, a second flag indicating the success/failure of the FEC, and a third flag indicating the detection/non-detection of a CRC.

According to another aspect of the present invention, an apparatus of a transmitter in a communication system is provided. The apparatus includes a multiplexer for generating a transport packet header including an error indicating field; an encoding unit for constructing a frame including at least one transport packet, and performing FEC encoding on the frame; and a transmitting unit for transmitting the frame, wherein the error indicating field includes at least one of a first flag indicating the presence/absence of an error in the transport packet, a second flag indicating the success/failure of an FEC, and a third flag indicating the detection/non-detection of a CRC.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will be described herein below with reference to the accompanying drawings. In the following description, well-known functions or constructions are not described in detail to avoid obscuring the present invention in unnecessary detail.

Data transmitted through a transport packet includes a video stream, an audio stream, and an Internet Protocol (IP) data stream. The video stream is compressed, converted into a video Packetized Elementary Stream (PES) packet, and then included in a payload of the transport packet. The audio stream is compressed, converted into an audio PES packet, and then included in a payload in the transport packet. The data stream is converted into a Multi Protocol Encapsulation (MPE) stream packet and then included in a payload of the transport packet. The data stream may include IP data. A transmitter constructs a frame using transport packets. Accordingly, a data field of the frame includes transport packets, and FEC encoding is performed on a frame-by-frame basis.

According to an embodiment of the present invention, an error indicating field includes a plurality of flags indicating different information. For example, the plurality of flags include a first flag indicating the presence or absence of an error in a transport packet, a second flag indicating the success or failure of an FEC, and a third flag indicating the detection or non-detection of a CRC. That is, the error indicating field may include at least one of the first flag, the second flag, and the third flag.

Figure 1:
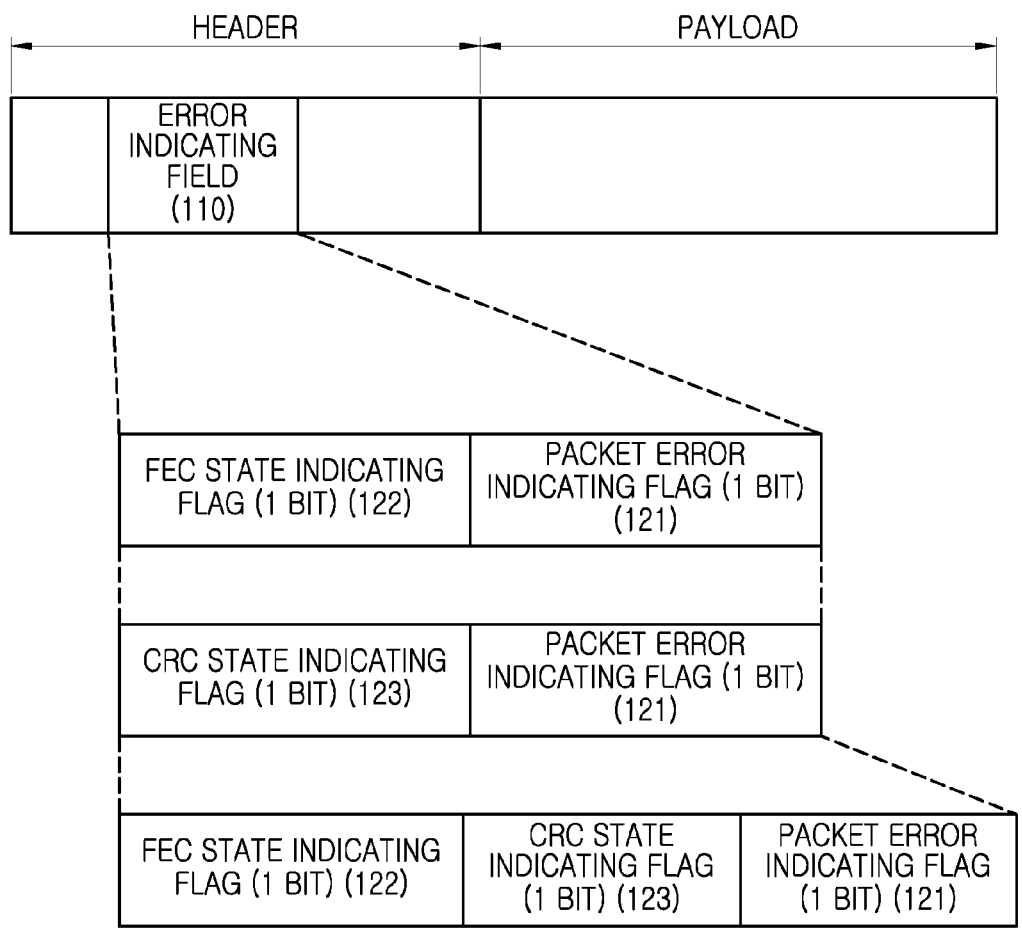
FIG. 1 is a diagram illustrating error indicating fields in an audio and video communication system according to an embodiment of the present invention.

FIG. 1 is a diagram illustrating error indicating fields in an audio and video communication system according to an embodiment of the present invention.

Referring to FIG. 1, a transport packet includes a header and a payload. The header includes an error indicating field 110. For example, as described above, the error indicating field 110 may include three types of flags, as illustrated in FIG. 1.

According to an embodiment of the present invention, a first flag 121 indicating the presence/absence of an error in a transport packet may be used as a first bit of the error indicating field 110, and a second flag 122 indicating the success/failure of an FEC may be used as a $0^{th}$ bit of the error indicating field 110. That is, the error indicating field 110 may include [Second Flag; First Flag]. In this case, the meaning of each set-up value is shown in Table 1 below.

TABLE 1

| Error Indicting Field Value (bit0 = Second Flag bit1 = First Flag) | Meaning |
|---|---|
| 00 | No uncorrectable error in packet & Success of FEC |
| 01 | No uncorrectable error in packet & Failure of FEC |
| 10 | Uncorrectable error in packet & Success of FEC (=CRC error by FEC miscorrection) |
| 11 | Uncorrectable error in packet & Failure of FEC |

According to another embodiment of the present invention, a first flag 121 indicating the presence or absence of an error in a transport packet may be used as a first bit of the error indicating field 110, and a third flag 123 indicating the detection or non-detection of a CRC may be used as a $0^{th}$ bit of the error indicating field 110. That is, the error indicating field 110 may include [Third Flag; First Flag]. In this case, the meaning of each set-up value is shown in Table 2 below.

TABLE 2

| Error Indicting Field Value (bit0 = Third Flag bit1 = First Flag) | Meaning |
|---|---|
| 00 | No uncorrectable error in packet & Detection of CRC (=No error as a result of CRC) |
| 01 | No uncorrectable error in packet & Non-detection of CRC (=Success of FEC) |
| 10 | Uncorrectable error in packet & Detection of CRC (=Error as a result of CRC) |
| 11 | Uncorrectable error in packet & Non-detection of CRC (=Failure of FEC) |

According to another embodiment of the present invention, a first flag 121 indicating the presence or absence of an error in a transport packet may be used as a second bit of the error indicating field 110, a third flag 123 indicating the detection or non-detection of a CRC may be used as a first bit of the error indicating field 110, and a second flag 122 indicating the success or failure of an FEC may be used as a $0^{th}$ bit of the error indicating field 110. That is, the error indicating field 110 may include [Second Flag; Third Flag; First Flag]. In this case, the meaning of each set-up value is shown in Table 3 below.

TABLE 3

| Error Indicting Field Value (bit0 = Second Flag bit1 = Third Flag bit2 = First Flag) | Meaning |
|---|---|
| 000 | No uncorrectable error in packet & Detection of CRC & Success of FEC (=Success of FEC including packet, and No error as a result of CRC) |
| 001 | No uncorrectable error in packet & Detection of CRC & Failure of FEC (=Failure of FEC including packet, but No error as a result of CRC) |
| 010 | No uncorrectable error in packet & Non-detection of CRC & Success of FEC (=Success of FEC including packet, and Non-detection or failure of CRC) |
| 011 | Reserved for the future use |
| 100 | Uncorrectable error in packet & Detection of CRC & Success of FEC (=Success of FEC including packet, but Error as a result of CRC (Indication of FEC miscorrection)) |

TABLE 3-continued

| Error Indicting Field Value (bit0 = Second Flag bit1 = Third Flag bit2 = First Flag) | Meaning |
| --- | --- |
| 101 | Uncorrectable error in packet & Detection of CRC & Failure of FEC (=Failure of FEC including packet, and Error as a result of CRC) |
| 110 | Reserved for the future use |
| 111 | Uncorrectable error in packet & Non-detection of CRC & Failure of FEC (=Failure of FEC including packet, and Non-detection or failure of CRC) |

In accordance with an embodiment of the present invention, a transport packet may have a variable length. If the transport packet exceeds a reference size (=N bits), the transport packet may be divided into at least two sub-packets, and there may be an error indicating field for each of the sub-packets.

Figure 2:
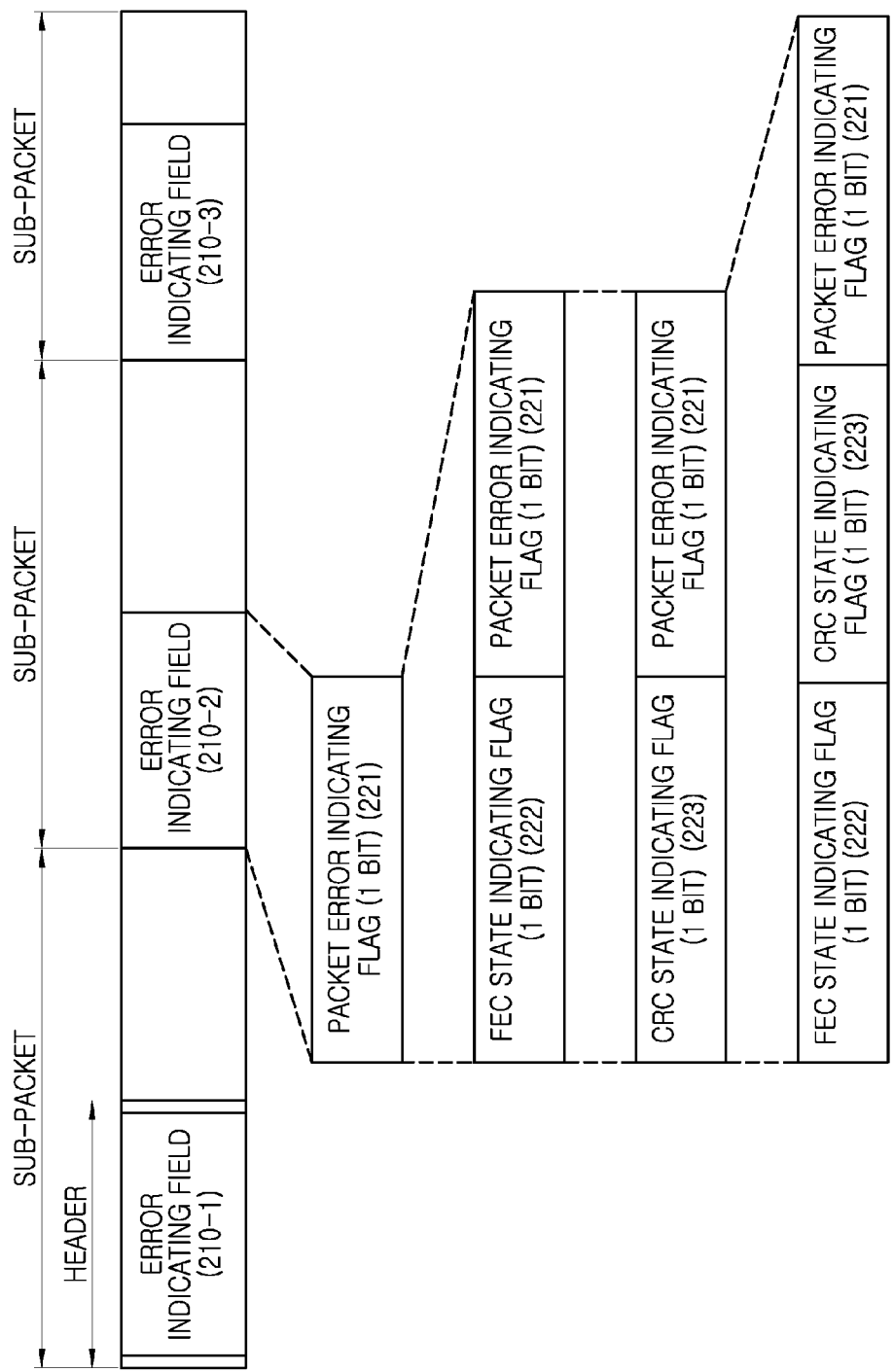
FIG. 2 is a diagram illustrating error indicating fields of a variable-length packet in an audio and video communication system according to an embodiment of the present invention.

FIG. 2 is a diagram illustrating error indicating fields of a variable-length packet in an audio and video communication system according to an embodiment of the present invention.

Referring to FIG. 2, a transport packet includes a plurality of sub-packets, and each of the sub-packets includes an error indicating field 210-1, 210-2, and 210-3, respectively. The lengths of the sub-packets may be identical or different from each other. If the lengths of the sub-packets are different, the length of each sub-packet may be predefined depending on the position of the sub-packet.

Referring to FIG. 2, the error indicating field 210 has four different structures.

According to an embodiment of the present invention, a first flag 221 indicating the presence or absence of an error in a transport packet may be used as an error indicating field 210. That is, the error indicating field 210 may include [First Flag].

According to another embodiment of the present invention, a first flag 221 indicating the presence or absence of an error in a transport packet may be used as a first bit of an error indicating field 210, and a second flag 222 indicating the success or failure of an FEC may be used as a $0^{th}$ bit of the error indicating field 210. That is, the error indicating field 210 may include [Second Flag; First Flag]. In this case, the meaning of each set-up value is shown in Table 1.

According to another embodiment of the present invention, a first flag 221 indicating the presence or absence of an error in a transport packet may be used as a first bit of an error indicating field 210, and a third flag 223 indicating the detection or non-detection of a CRC may be used as a $0^{th}$ bit of the error indicating field 210. That is, the error indicating field 210 may include [Third Flag; First Flag]. In this case, the meaning of each set-up value is shown in Table 2.

According to another embodiment of the present invention, a first flag 221 indicating the presence or absence of an error in a transport packet may be used as a second bit of an error indicating field 210, a third flag 223 indicating the detection or non-detection of a CRC may be used as a first bit of the error indicating field 210, and a second flag 222 indicating the success or failure of an FEC may be used as a $0^{th}$ bit of the error indicating field 210. That is, the error indicating field 210 may include [Second Flag; Third Flag; First Flag]. In this case, the meaning of each set-up value is shown in Table 3.

Although not illustrated in FIG. 2, according to another embodiment of the present invention, a transport packet may include a plurality of sub-packets where only the first sub-packet among the sub-packets includes an error indicating field 210-1. That is, error indicating fields 210-2 and 210-3 of the other sub-packets are excluded. In this case, the error indicating field 210-1 includes the first flag 221, wherein the presence or absence of an error in the first sub-packet (not in the entire transport packet) may be indicated. This is structure may be more effective if a video/audio PES packet or an MPE stream packet follows a header of the transport packet. That is, although the there may be an error somewhere in the transport packet, if the first sub-packet has no error, a receiver may rely on header information and the video/audio PES packet or the MPE stream packet.

Additionally, although not illustrated in FIG. 2, according to another embodiment of the present invention, the error indicating field 210-1 of the first sub-packet and the error indicating fields 210-2 and 210-3 of the other sub-packets may have different structures. For example, the error indicating field 210-1 of the first sub-packet may include the first flag 221 indicating the presence or absence of an error, as the second bit; the third flag 223 indicating the detection or non-detection of a CRC, as the first bit; and the second flag 222 indicating the success or failure of an FEC, as the $0^{th}$ bit. The error indicating fields 210-2 and 210-3 of the other sub-packets may include only the first flag 221 indicating the presence or absence of an error in the relevant sub-packet or the first sub-packet.

Further, although not illustrated in FIG. 2, according to another embodiment of the present invention, the error indicating fields 210-1, 210-2, and 210-3 of the sub-packets may have different structures in order to increase a degree of freedom of packet structures. For example, the error indicating field 210-1 of the first sub-packet may include the first flag 221, the error indicating field 210-2 of the second sub-packet may include the third flag 223 and the first flag 221, and the error indicating field 210-3 of the third sub-packet may include the second flag 222, the third flag 223, and the first flag 221.

Figure 3:
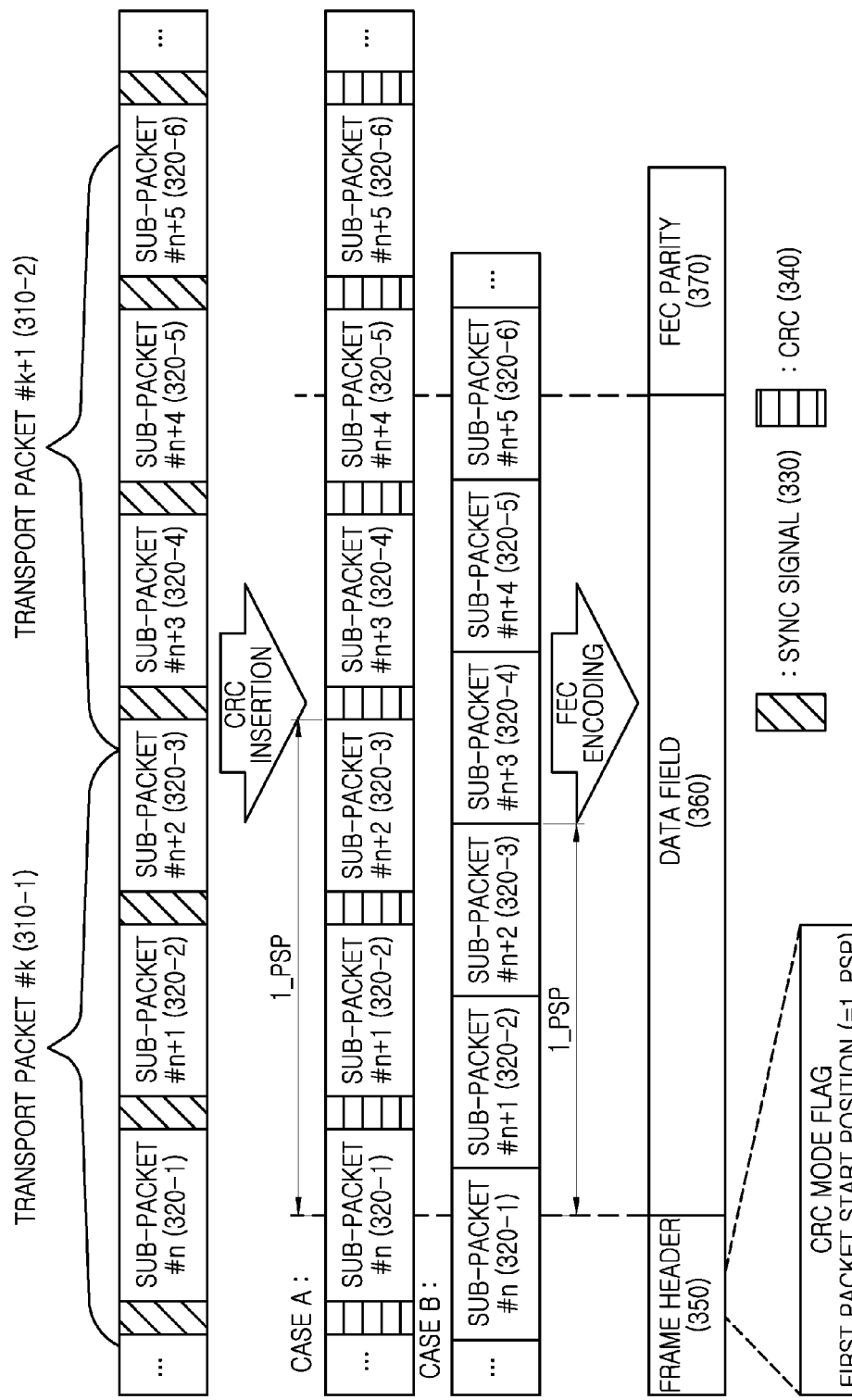
FIG. 3 is a diagram illustrating a frame structure in an audio and video communication system according to an embodiment of the present invention.

FIG. 3 is a diagram illustrating a frame structure in an audio and video communication system according to an embodiment of the present invention. Specifically, FIG. 3 illustrates the insertion of CRCs in transport packets 310-1 and 310-2 including a plurality of sub-packets 320-1 to 320-6, and constructing a frame through FEC encoding.

Referring to FIG. 3, transport packets 310-1 and 310-2 include a plurality of sub-packets 320-1 to 320-6 and sync signals 330 for the respective sub-packets. Through a CRC inserting process, a transmitter converts the transport packets 310-1 and 310-2 as illustrated in Case A or Case B. In Case A, a CRC is used and the transmitter removes the sync signals 330 and inserts CRC codes 340.

In Case B, a CRC is not applied, and the transmitter removes sync signals 330. Whether to apply the CRC is determined according to an operation mode of the transmitter. Thereafter, the transmitter constructs a frame. Specifically, the transmitter divides sub-packets 320-1 to 320-6 by the size of a data field 360, attaches a frame header 350 including a CRC mode flag indicating whether the CRC is applied and a first packet start position field indicating an offset of the start position of the first transport packet in the data field 360 by the number of bits or the number of bytes, and adds an FEC parity 370. Herein, all the error indicating fields may be set to a value indicating the absence of an error.

Frame processing in a receiver is performed in the reverse order. The receiver performs an error correction by FEC, detects the whether the CRC is applied through a CRC mode flag included in a frame header, and detects the start position of the first transport packet through a first packet start position field. Thereafter, the receiver acquires synchronization of sub-packets. For example, the receiver acquires synchronization of each sub-packet by using a predefined sub-packet length or a transport packet length. The transport packet length may be predefined or may be detected through the header of the transport packet. If a CRC is applied, the receiver detects a CRC for each sub-packet and sets a value of an error correction field for each sub-packet by using an FEC result and a CRC result.

If the FEC fails, the receiver cannot determine whether the CRC is applied or the start point of the first transport packet because it cannot rely on the frame header information of the current frame. In this case, if the FEC was successful in the previous frame, the receiver may use information included in the previous frame to determine the whether the CRC is applied in the current frame and the start point of the first transport packet. For example, the receiver may detect the whether the CRC is applied in the previous frame through the frame header of the previous frame, and may determine the whether the CRC is applied in the current frame on the assumption that the when CRC is applied the previous frame, it is also applied in the current frame. Also, the receiver may determine a start position of the first transport packet in the current frame by determining a length of a remaining part of the last transport packet of the previous frame using the length of the last transport packet included in the previous frame. The remaining part is a part of the last transport packet, which was not included in the previous frame and is included in the current frame because a size of the previous frame was not large enough to include the entire last transport packet.

Figure 4:
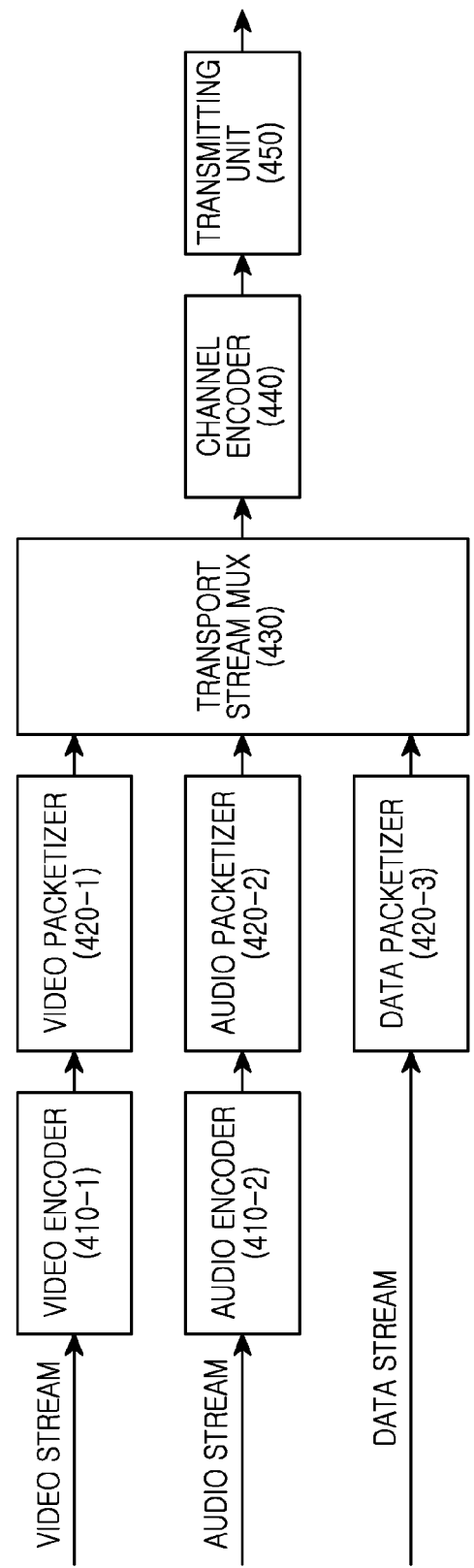
FIG. 4 is a block diagram illustrating a transmitter in an audio and video communication system according to an embodiment of the present invention.

FIG. 4 is a block diagram illustrating a transmitter in an audio and video communication system according to an embodiment of the present invention.

Referring to FIG. 4, the transmitter includes a video encoder 410-1, an audio encoder 410-2, a video packetizer 420-1, an audio packetizer 420-2, a data packetizer 420-3, a transport stream multiplexer (MUX) 430, a channel encoder 440, and a transmitting unit 450.

The video encoder 410-1 compresses a video stream according to a relevant video codec standard. The audio encoder 410-2 compresses an audio stream according to a relevant audio codec standard. The video packetizer 420-1 divides the compressed video stream by the predetermined unit and inserts a header in order to generate video PES packets. The audio packetizer 420-2 divides the compressed audio stream by the predetermined unit and inserts a header in order to generate audio PES packets.

Each of the PES packets includes a PES header including information for playing an audio stream and a video stream, e.g., time stamp information.

The data packetizer 420-3 divides a data stream by the predetermined unit and inserts a header in order to generate MPE stream packets.

The transport stream MUX 430 selects a bit string of the MPE stream packets, the video PES packets and the audio PES packets as a payload, and inserts a transport packet header in order to generate transport packets. According to an embodiment of the present invention, the transport stream MUX 430 includes an error indicating field in the transport packet header. Herein, the error indicating field includes at least one of a first flag indicating the presence or absence of an error in the transport packet, a second flag indicating the success or failure of an FEC, and a third flag indicating the detection or non-detection of a CRC.

According to an embodiment of the present invention, if a variable-length transport packet is used, the transport stream MUX 430 divides a transport packet, which has a length greater than a reference size, into a plurality of sub-packets. In this case, the transport stream MUX 430 inserts additional error indicating fields for the respective sub-packets. Also, the transport stream MUX 430 may insert a sync signal for each sub-packet, and the transport stream MUX 430 may insert a CRC code for each transport packet or each sub-packet according to the operation mode.

The channel encoder 440 performs channel encoding on transport packets. The channel encoder 440 selects a data field of a frame from a bit string of the transport packets, attaches a frame header, and performs frame-by-frame FEC encoding to add an FEC parity. Herein, the frame header includes a CRC mode flag indicating the whether the CRC is applied and a first packet start position field indicating an offset of the start position of the first transport packet in the data field by the number of bits or the number of bytes.

The transmitting unit 450 transmits the channel-encoded transport packets through a channel. Herein, the channel may be a wired channel or a wireless channel. If the channel is a wireless channel, the transmitting unit 450 modulates a bit string of the transport packets to generate complex symbols, performs physical layer processing according to the standards of the communication system, up-converts it into a Radio Frequency (RF) signal, and transmits the RF signal through an antenna.

Figure 5:
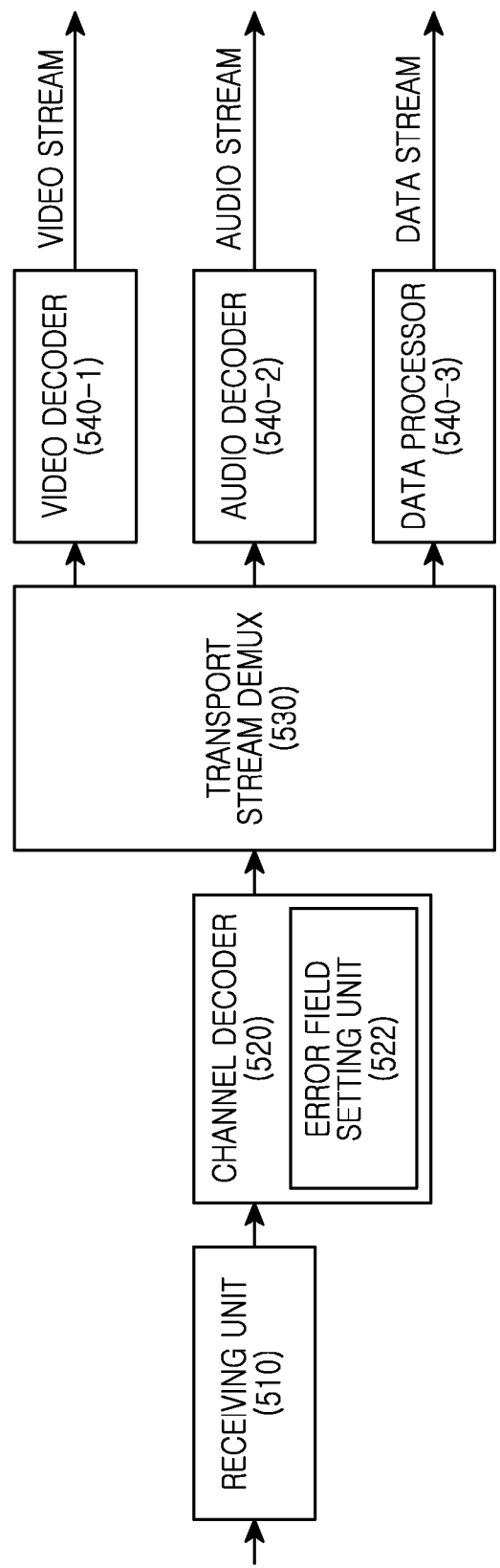
FIG. 5 is a block diagram illustrating a receiver in an audio and video communication system according to an embodiment of the present invention.

FIG. 5 is a block diagram illustrating a receiver in an audio and video communication system according to an embodiment of the present invention.

Referring to FIG. 5, the receiver includes a receiving unit 510, a channel decoder 520, a transport stream demultiplexer (DEMUX) 530, a video decoder 540-1, an audio decoder 540-2, and a data processor 540-3.

The receiver 510 restores channel-encoded frames from a signal received through a channel. Herein, the channel may be a wired channel or a wireless channel. If the channel is a wireless channel, the receiver down-converts an RF signal, received through an antenna, into a baseband signal, performs physical layer processing according to the standards of the communication system, and restores a bit string by demodulation.

The channel decoder 520 performs channel decoding on the channel-encoded frame. That is, the channel decoder 520 performs FEC decoding to attempt an error correction. Also, the channel decoder 520 uses a CRC mode flag included in a frame header of the frame to determine the whether the CRC is applied to the transport packets included in the frame, and uses a first packet start position field to determine the start position of the first transport packet. If the FEC fails, the channel decoder 520 uses information included in the previous frame to determine the whether the CRC is applied in the current frame and the start point of the first transport packet, as described above.

Additionally, the channel decoder 520 determines a start position of the first transport packet in the current frame by using the length of the last transport packet included in the previous frame to determine the remaining length of the last transport packet included in the current frame, without being included in the previous frame.

If a CRC is applied, the channel decoder 520 detects a CRC for each packet. An error field setting unit 522 of the channel decoder 520 may set a value of an error correction field for each packet by using an FEC result and a CRC result. Herein, the error indicating field includes at least one of a first flag indicating the presence or absence of an error in the transport packet, a second flag indicating the success or failure of an FEC, and a third flag indicating the detection or non-detection of a CRC.

The transport stream DEMUX 530 receives a data string of the transport packets output from the channel decoder 520, and determines a data type of a payload of each transport packet by using information (e.g., a packet IDentifier (ID)) included in a header of each transport packet. The transport stream DEMUX 530 classifies each transport packet according to the data type of the payload, and outputs the transport packet to the video decoder 540-1, the audio decoder 540-2, or the data processor 540-3 according to the classification result.

The video decoder 540-1 decompresses a compressed video stream according to a video compression codec standard used in the transmitter, thereby restoring a video stream. Herein, the video decoder 540-1 may use a value of the error correction field to determine the reliability of a video stream, and may process the video stream according to the determined reliability.

The audio decoder 540-2 decompresses a compressed audio stream according to an audio compression codec standard used in the transmitter, thereby restoring an audio stream. Herein, the audio decoder 540-2 may use a value of the error correction field to determine the reliability of an audio stream, and may process the audio stream according to the determined reliability.

The data processor 540-3 interprets a data stream and performs an operation corresponding to the interpreted information. Herein, the data processor 540-3 may use a value of the error correction field to determine the reliability of a data stream, and may process the data stream according to the determined reliability.

Figure 6:
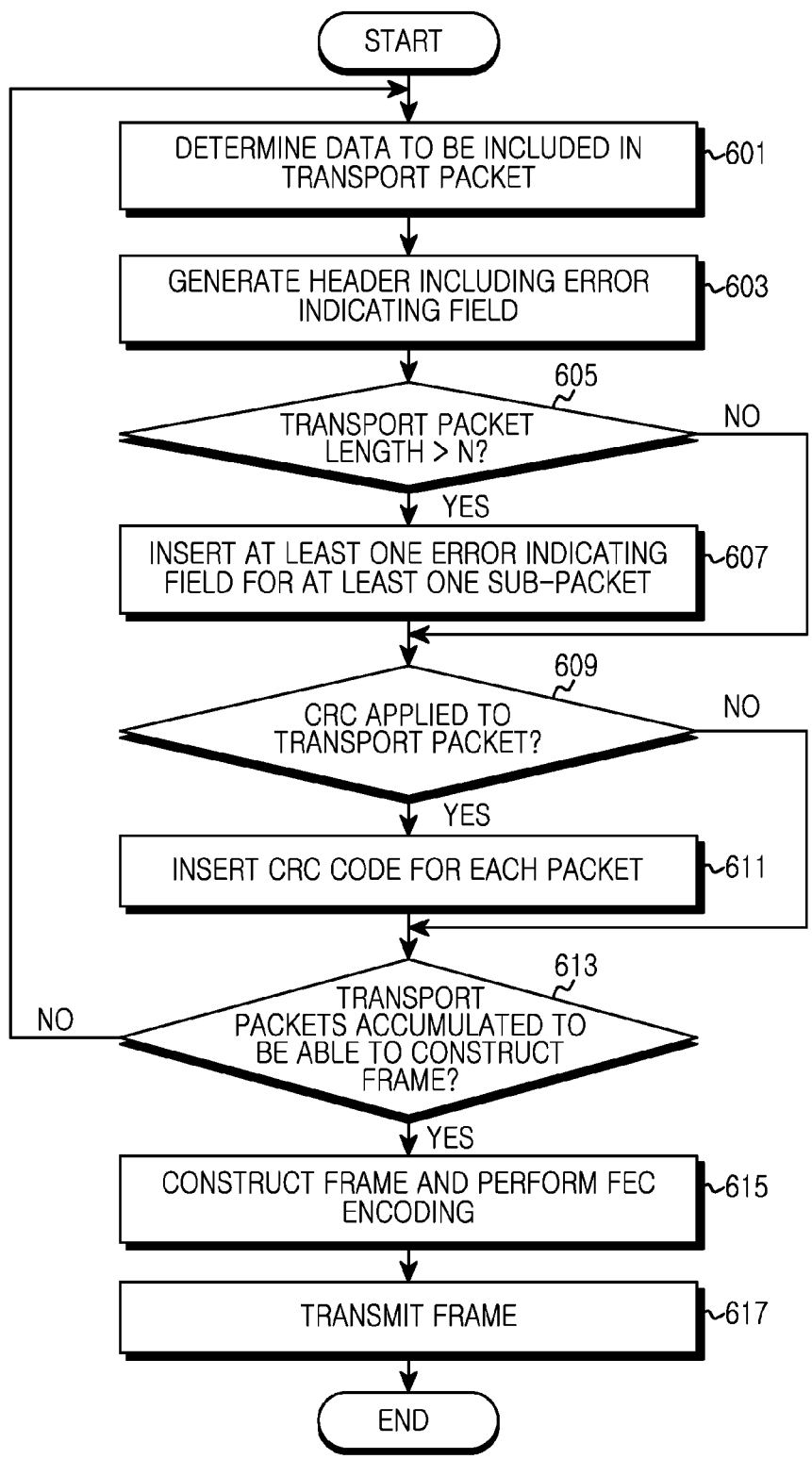
FIG. 6 is a flow diagram illustrating an operation process of a transmitter in an audio and video communication system according to an embodiment of the present invention.

FIG. 6 is a flow diagram illustrating an operation process of a transmitter in an audio and video communication system according to an embodiment of the present invention.

Referring to FIG. 6, in step 601, the transmitter determines a range to be included in one transport packet, from a bit string of MPE stream packets, video PES packets, and audio PES packets to be included in a transport packet. Herein, the length of the transport packet may be variable or fixed.

In step 603, the transmitter generates a header of a transport packet including an error indicating field. Herein, the error indicating field includes at least one of a first flag indicating the presence or absence of an error in the transport packet, a second flag indicating the success or failure of an FEC, and a third flag indicating the detection or non-detection of a CRC.

In step 605, the transmitter determines whether the transport packet length is greater than a reference size (=N bits). Specifically, steps 605 and 607 are performed if a variable-length transport packet is used. Thus, if a fixed-length transport packet is used, Step 605 and step 607 may be omitted.

If the transport packet length is greater than the reference size, the transmitter inserts at least one error indicating field for at least one sub-packet in step 607. If the transport packet length is greater than the reference size, the transport packet is divided into a plurality of sub-packets. Thus, the transmitter inserts an error indicating field for at least one sub-packet that does not include a header. Herein, the error indicating field may be identical to the error indicating field included in the header.

If the transport packet length is less than or equal to the reference size or after step 607, in step 609, the transmitter determines whether a CRC is applied to a transport packet. Whether the CRC is applied depends on the operation mode of the transmitter, which may be fixed in the system or may change adaptively according to communication environments, service types, and Quality of Service (QoS) features. That is, the transmitter detects a current operation mode and determines whether the current operation mode is a CRC-based operation mode.

If the CRC is applied in step 609, the transmitter inserts a CRC code for each packet in step 611. That is, for a fixed-length packet, the transmitter generates and inserts a CRC code for a transport packet.

According to an embodiment of the present invention, for a variable-length packet, the transmitter generates and inserts CRC codes for the respective sub-packets. For example, the transmitter may remove a sync signal and insert the CRC code at the position of the sync signal.

If the CRC is not applied in step 609 or after step 611, in step 613, the transmitter determines whether transport packets are accumulated to be able to construct a frame. That is, the frame may include a plurality of transport packets, and some transport packets may be divided and included in different frames. If transport packets are not accumulated to be able to construct a frame, the operation returns to step 601.

If transport packets are accumulated to be able to construct a frame in step 613, the transmitter constructs a frame and performs FEC encoding on the frame in step 615. For example, the transmitter generates a frame header including a CRC mode flag indicating whether the CRC is applied and a first packet start position field indicating a start position of the first transport packet in the frame, and constructs a frame by connecting the frame header, a data field including the transport packets, and an FEC parity.

In step 617, the transmitter transmits the frame through a channel. Herein, the channel may be a wired channel or a wireless channel. If the channel is a wireless channel, the transmitter modulates a bit string of the frame to generate complex symbols, performs physical layer processing according to the standards of the communication system, up-converts it into an RF signal, and transmits the RF signal through an antenna.

Figure 7:
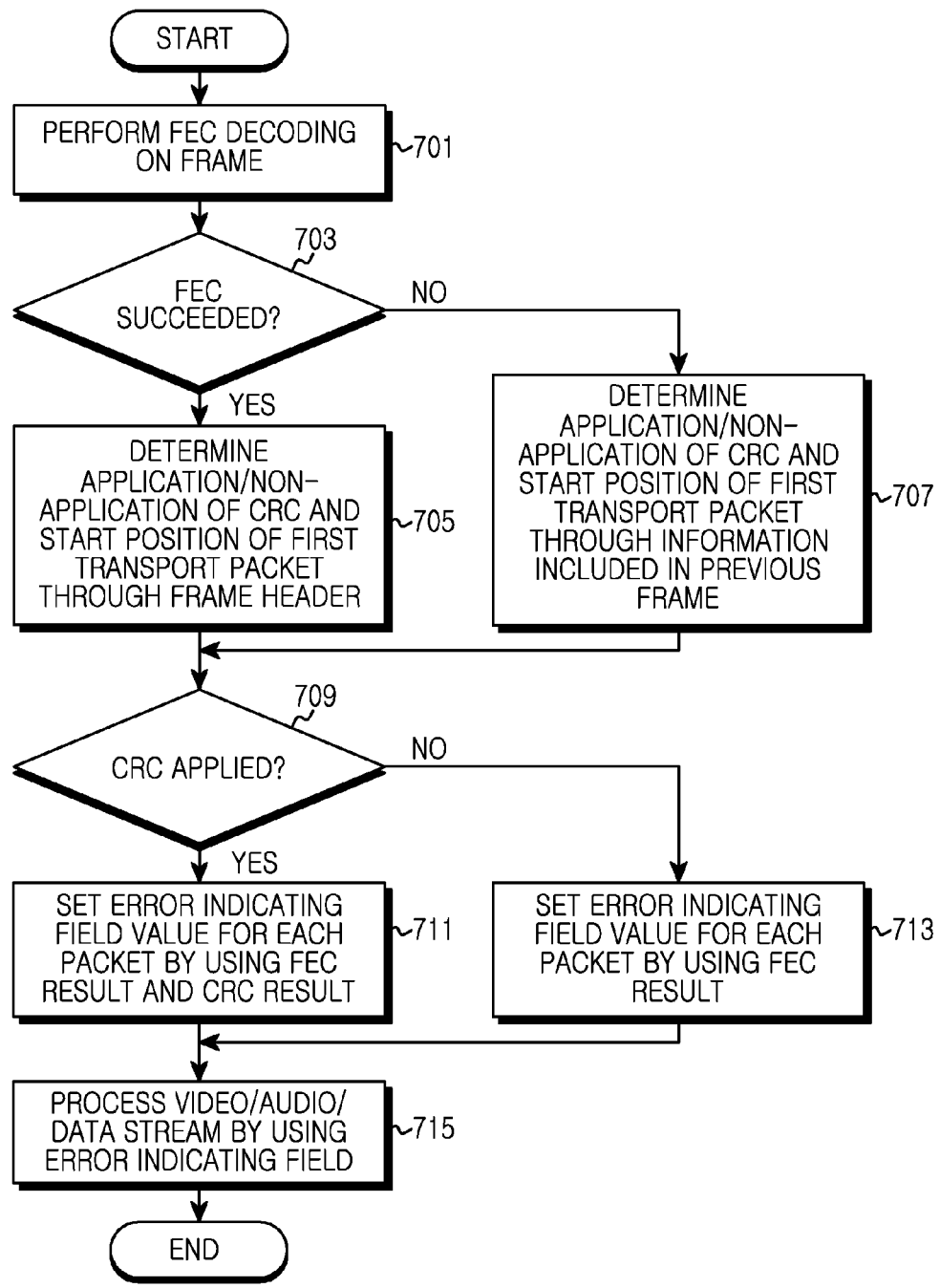
FIG. 7 is a flow diagram illustrating an operation process of a receiver in an audio and video communication system according to an embodiment of the present invention.

FIG. 7 is a flow diagram illustrating an operation process of a receiver in an audio and video communication system according to an embodiment of the present invention.

Referring to FIG. 7, in step 701, the receiver receives a frame including at least one transport packet, and performs FEC decoding on the frame. The frame may include a plurality of transport packets, and some transport packets may be divided and included in different frames. That is, the receiver decodes the frame to attempt an FEC. In step 703, the receiver determines whether the FEC is successful.

If the FEC is successful, the receiver uses a frame header to determine the whether the CRC is applied to transport packets included in the frame and the start position of the first transport packet in step 705. That is, the frame header includes a CRC mode flag indicating the whether the CRC is applied and a first packet start position field indicating an offset of the start position of the first transport packet in the data field of the frame by the number of bits or the number of bytes.

However, if the FEC has failed, the receiver uses information included in the previous frame to determine the whether the CRC is applied to the transport packets included in the frame and the start point of the first transport packet in step 707. For example, the receiver detects the whether the CRC is applied in the previous frame through a frame header of the previous frame, and determines that when the CRC is applied in the previous frame then the CRC is also applied in the current frame. Also, the receiver uses the length of the last transport packet included in the previous frame to determine the remaining length of the last transport packet included in the current frame without being included in the previous frame, and uses the remaining length of the last transport packet to calculate a start position of the first transport packet.

After step 705 or 707, the receiver determines whether a CRC is applied in step 709. Whether the CRC is applied depends on the determination result of step 705 or 707.

If the CRC is applied, in step 711, the receiver sets a value of an error indicating field by using the FEC result and the CRC code result determined in step 703. The error indicating field and the CRC code are present in each transport packet.

According to an embodiment of the present invention, if the transport packet includes a plurality of sub-packets, each of the sub-packets includes the error indicating field and the CRC code. However, according to another embodiment, if the transport packet includes a plurality of sub-packets but each transport packet includes one error indicating field, the receiver sets a value of the error indicating field to a value indicating an error state of the first sub-packet. Herein, the error indicating field includes at least one of a first flag indicating the presence or absence of an error in the transport packet, a second flag indicating the success or failure of an FEC, and a third flag indicating the detection or non-detection of a CRC. If the second flag is included, the second flags of all the error indicating fields in the frame are set to the same value. If the third flag is used, the third flags of all the error indicating fields in the frame may vary according to the CRC results.

If the CRC is not applied in step 709 in step 713, the receiver sets a value of an error indicating field by using the FEC result determined in step 703. The error indicating field and the CRC code are present in each transport packet. According to an embodiment, if the transport packet includes a plurality of sub-packets, each of the sub-packets includes the error indicating field and the CRC code. However, according to another embodiment, if the transport packet includes a plurality of sub-packets, but each transport packet includes one error indicating field, the receiver sets a value of the error indicating field to a value indicating an error state of the first sub-packet. If the third flag indicating the detection or non-detection of a CRC is included in the error indicating field, the receiver may set the third flag to a value indicating non-detection.

After step 711 or 713, the receiver processes a video/audio/data stream with reference to the error indicating fields in step 715. For example, the receiver may set a value of an erasure flag for an erasure correction with reference to the error indicating fields.

As described above, in accordance with the above-described embodiments of the present invention, the FEC result and the CRC result are reflected to indicate a detailed error state in an audio and video communication system, thereby making it possible to accurately transmit an error state of the transport packet with more detail and with higher reliability.

While the present invention has been shown and described with reference to certain embodiments thereof, it will be understood by those skilled in the art that various changes in form and details may be made therein without departing from the spirit and scope of the present invention as defined by the appended claims and any equivalents thereof.

What is claimed is:

1. A method for operating a receiver in a communication system, the method comprising the steps of:
   receiving a frame including a transport packet;
   attempting Forward Error Correction (FEC) on the frame; and
   setting a value of an error indicating field in the transport packet according to a result of the FEC,
   wherein the error indicating field includes a first flag indicating a presence or absence of an error in the transport packet, and at least one of a second flag indicating a success or failure of the FEC and a third flag indicating detection or non-detection of a Cyclic Redundancy Check (CRC).

2. The method of claim 1, further comprising:
   determining whether there is an error in the transport packet or each sub-packet of the transport packet, based on a CRC code for the transport packet or each sub-packet.

3. The method of claim 1, further comprising:
   determining whether the CRC is applied to the transport packet and a start position of a first transport packet using a header of the frame.

4. The method of claim 1, further comprising:
   determining whether the CRC is applied to the transport packet and a start position of a first transport packet using information from a previous frame.

5. The method of claim 4, wherein determining whether the CRC is applied to the transport packet comprises:
   detecting whether CRC was applied in the previous frame from a frame header of the previous frame; and
   determining whether the CRC applied to the transport packet, based on whether the CRC was applied in the previous frame.

6. The method of claim 4, wherein determining the start position of the first transport packet comprises:
   determining a remaining length of a last transport packet included in the frame using a length of a last transport packet included in the previous frame; and
   calculating the start position of the first transport packet in the frame using the remaining length of the last transport packet in the frame.

7. The method of claim 1, wherein setting the value of the error indicating field comprises setting the third flag to a value indicating non-detection, if a CRC is not applied for the transport packet or each sub-packet in the frame.

8. The method of claim 1, wherein setting the value of the error indicating field comprises setting the value of the error indicating field to a value indicating an error state of a first sub-packet, if the transport packet includes a plurality of sub-packets and each transport packet includes an error indicating field.

9. The method of claim 1, wherein the transport packet includes a plurality of sub-packets and an error indicating field for each sub-packet, and
   the error indicating field for each sub-packet includes a different flag combination.

10. A method for operating a transmitter in a communication system, the method comprising the steps of:
    generating a transport packet header including an error indicating field;
    constructing a frame including a transport packet and the transport packet header;
    performing Forward Error Correction (FEC) encoding on the frame; and
    transmitting the frame,
    wherein the error indicating field includes a first flag indicating a presence or absence of an error in the transport packet, and at least one of a second flag indicating a success or failure of the FEC encoding and a third flag indicating detection or non-detection of a Cyclic Redundancy Check (CRC).

11. The method of claim 10, further comprising:
    inserting a CRC code for the transport packet.

12. The method of claim 10, further comprising:
    dividing the transport packet into a plurality of sub-packets; and inserting CRC codes for each of the plurality of sub-packets.

13. An apparatus of a receiver in a communication system, comprising:
a receiving unit for receiving a frame including a transport packet;
a decoding unit for attempting Forward Error Correction (FEC) on the frame; and
a channel decoding unit for setting a value of an error indicating field in the transport packet according to a result of the FEC,
wherein the error indicating field includes a first flag indicating a presence or absence of an error in the transport packet, and at least one of a second flag indicating a success or failure of the FEC and a third flag indicating detection or non-detection of a Cyclic Redundancy Check (CRC).

14. The apparatus of claim 13, wherein the channel decoding unit determines whether there is an error in the transport packet or each sub-packet of the transport packet, based on a CRC code for the transport packet or each sub-packet.

15. The apparatus of claim 13, wherein the channel decoding unit determines whether the CRC is applied to the transport packet and a start position of a first transport packet using a header of the frame.

16. The apparatus of claim 13, wherein the channel decoding unit determines whether the CRC is applied to the transport packet and a start position of a first transport packet using information from a previous frame.

17. The apparatus of claim 16, wherein the channel decoding unit detects whether CRC was applied in the previous frame from a frame header of the previous frame, and determines whether the CRC applied to the transport packet, based on whether the CRC was applied in the previous frame.

18. The apparatus of claim 16, wherein the channel decoding unit determines a remaining length of a last transport packet included in the frame using a length of a last transport packet included in the previous frame, and calculates the start position of the first transport packet in the frame using the remaining length of the last transport packet in the frame.

19. The apparatus of claim 13, wherein the channel decoding unit sets the third flag to a value indicating non-detection, if a CRC is not applied for the transport packet or each sub-packet in the frame.

20. The apparatus of claim 13, wherein the channel decoding unit sets the value of the error indicating field comprises setting the value of the error indicating field to a value indicating an error state of a first sub-packet, if the transport packet includes a plurality of sub-packets and each transport packet includes an error indicating field.

21. The apparatus of claim 13, wherein the transport packet comprises a plurality of sub-packets and an error indicating field for each sub-packet, and
wherein the error indicating field for each sub-packet comprises a different flag combination.

22. An apparatus of a transmitter in a communication system, comprising:
a multiplexer for generating a transport packet header including an error indicating field;
an encoding unit for constructing a frame including a transport packet and the transport packet header, and performing Forward Error Correction (FEC) encoding on the frame; and
a transmitting unit for transmitting the frame,
wherein the error indicating field includes a first flag indicating a presence or absence of an error in the transport packet, and at least one of a second flag indicating a success or failure of the FEC encoding and a third flag indicating detection or non-detection of a Cyclic Redundancy Check (CRC).

23. The apparatus of claim 22, wherein the multiplexer inserts a CRC code for the transport packet.

24. The apparatus of claim 22, wherein the multiplexer divides the transport packet into a plurality of sub-packets, and inserts CRC codes for each of the plurality of sub-packets.

* * * * *